United States Patent [19]
Bosiger

[11] 3,816,653

[45] June 11, 1974

[54] TELEVISION TEST APPARATUS

[75] Inventor: J. Warren Bosiger, Minneapolis, Minn.

[73] Assignee: Colonial Merchandising Corporation, Seneca Falls, N.Y.

[22] Filed: Dec. 13, 1972

[21] Appl. No.: 314,814

[52] U.S. Cl................ 178/7.9, 178/DIG. 4, 307/37, 307/98, 339/32 M

[51] Int. Cl......................... G01r 31/28, H01r 31/08

[58] Field of Search................. 178/DIG. 4, 6.8, 7.9; 179/1 PC, 1 SW; 307/37, 98; 323/43.5 R; 339/32 M, 151 B

[56] References Cited

UNITED STATES PATENTS

| | | | |
|---|---|---|---|
| 3,231,767 | 1/1966 | Powell | 339/32 M |
| 3,539,720 | 11/1970 | Marshall | 178/7.9 |

OTHER PUBLICATIONS

Tremaine, The AUDIO Cyclopedia, New York, Howard W. Sams Co. 1965 copy in AU233 page 949.

*Primary Examiner*—Howard W. Britton
*Attorney, Agent, or Firm*—Norman J. O'Malley; Robert E. Walrath; Cyril A. Krenzer

[57] ABSTRACT

Television test apparatus for testing television chassis is shown. The test apparatus incorporates a cathode ray tube and deflection components therefor together with coupling apparatus for coupling the deflection signals from the chassis under test to the yoke in the test apparatus. The coupling apparatus includes an impedance transformer such as an autotransformer and switch or jumper modules for connecting the horizontal deflection windings of the yoke in either series or parallel and to the autotransformer for providing proper impedances to the chassis under test.

9 Claims, 23 Drawing Figures

TELEVISION TEST APPARATUS

BACKGROUND OF THE INVENTION

This invention relates to test apparatus and more particularly to test apparatus for testing the operability of a television chassis. Test apparatus of this type is well known and is commonly used for testing and servicing color television chassis. For example, J. Zouhar, "Servicing with a Color-TV Test Jig," *Electronic Technician/Dealer*, January, 1972, pp. 46–47 and "Color-TV Test Jigs," *Electronic Servicing*, April, 1972, pp. 14–20 describe such test apparatus and the uses and advantages thereof.

Although such test jigs have long been known, their utility has been restricted by the wide variety of deflection systems in use in television receivers. For example, a wide variety of cathode ray tube sizes, deflection angles, and deflection circuits has required yokes with widely varying impedances and deflection voltages. Some prior art test jigs have used adaptors to provide some matching between various chassis deflection circuits and the test jig, however, such prior art test jigs can still accommodate only a small percentage of the various television receiver models requiring servicing. Also, known prior art test jigs normally cannot accommodate both solid-state and tube-type deflection drive systems without changing yokes or similar extensive and expensive modification of the test jig.

OBJECTS AND SUMMARY OF THE INVENTION

Accordingly, it is a primary object of this invention to obviate the above-noted disadvantages of the prior art.

It is a further object of this invention to provide test apparatus for testing television chassis which can test a wide variety of such chassis.

In one aspect of this invention the above and other objects and advantages are achieved in coupling apparatus for test apparatus for testing the operability of a chassis for providing deflection signals to a deflection yoke including vertical and horizontal deflection windings for deflecting an electron beam in a cathode ray tube. The coupling apparatus includes a receptacle having a plurality of terminals and an impedance transformer means having a plurality of terminals. The receptacle terminals are connected to the horizontal winding, to the impedance transformer means, and for receiving horizontal deflection signals from the chassis being tested. A plurality of modules each have a plurality of interconnected terminals for mating with respective ones of the plurality of terminals of the receptacle for connecting the horizontal deflection windings, the impedance transformer means, and the chassis under test in various arrangements.

BRIEF DESCRIPTION OF THE DRAWINGS

FIGS. 4A, 4B–13A, 13B are schematic diagrams illustrating various connections of the circuitry of FIG. 3.

DETAILED DESCRIPTION OF THE PREFERRED EMBODIMENT

For a better understanding of the present invention, together with other and further objects, advantages, and capabilities thereof, reference is made to the following disclosure and appended claims in connection with the above-described drawings.

Figure 1:
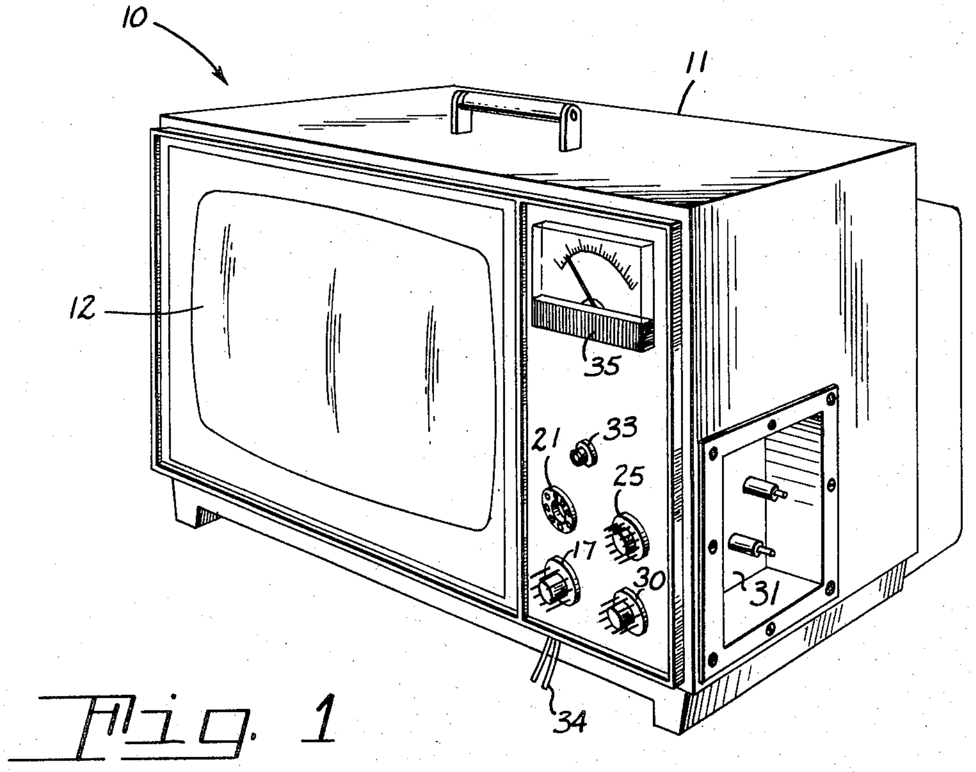
FIG. 1 is an isometric diagram of test apparatus incorporating the invention.
Figure 2:
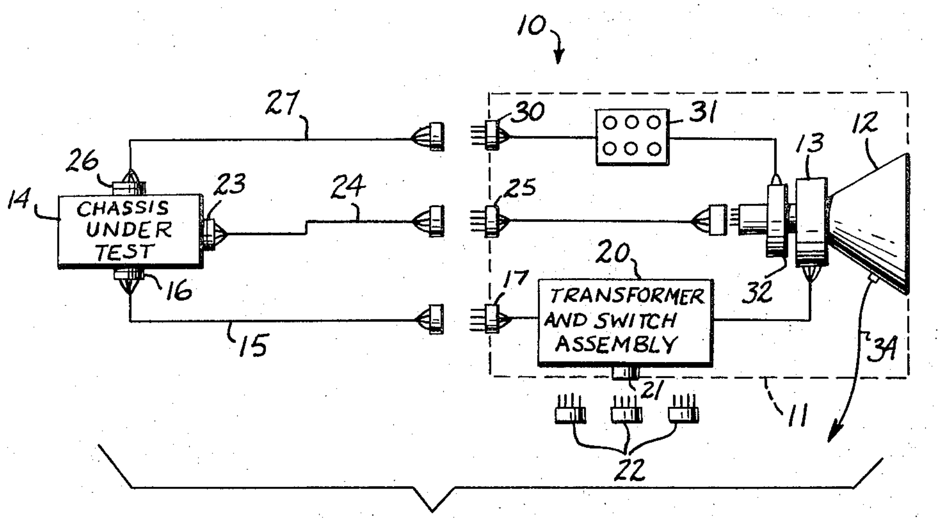
FIG. 2 is a block and schematic diagram illustrating test apparatus incorporating the invention.

FIGS. 1 and 2 illustrate test apparatus incorporating the invention. Test apparatus 10 includes a cabinet 11 that houses a cathode ray tube (CRT) 12. A deflection yoke 13 including horizontal and vertical deflection windings is mounted in operable relationship with CRT 12 for deflecting one or more electron beams therein. A chassis 14 being tested provides the usual signals to operate a CRT and deflection apparatus in a television receiver of which chassis 14 is ordinarily a part. The deflection signals including horizontal and vertical deflection signals are provided at a receptacle which is coupled via a lead extension 15 to a deflection or yoke input plug 17 of test apparatus 10. Since chassis 14 can have one of a variety of yoke plugs and lead connections, an adapter 16 is provided to match the chassis yoke receptacle to lead extension 15. Plug 17 is connected via transformer and switch assembly 20 to the horizontal and vertical deflection windings of yoke 13. Assembly 20 includes a receptacle 21 having a plurality of terminals for receiving mating terminals of each of a plurality of jumper or switch modules 22. Receptacle 21 and modules 22 and the other described receptacles and plugs can be either male or female plugs as desired. Lead extension 15, adaptor 16, plug 17, assembly 20, receptacle 21, and modules 22 comprise a coupling apparatus for coupling deflection signals from chassis 14 to yoke 13.

The CRT stem lead receptacle of chassis 14 is connected via an adaptor 23, a lead extension 24, and a plug 25 to the stem leads of CRT 12. Adaptor 23 is generally necessary only with older television receivers which used a different stem lead arrangement than that being used in newer receivers. The convergence receptacle of chassis 14 is connected via an adaptor 26 and a lead extension 27 to a plug 30. Plug 30 is connected via a convergence circuit 31 to a convergence yoke 32 mounted on the neck of CRT 12. If desired, an audio input plug 33 can also be provided and a speaker can be incorporated in test apparatus 10. Plugs and receptacles 17, 21, 25, 30, and 33 can be conveniently mounted on the front panel of cabinet 11 thereby providing ready access to the plugs. CRT 12 also requires high voltages such as the second anode voltage. Leads 34 for providing these voltages are preferably not connected through plugs. A high voltage meter 35 can also be provided, if desired, on the front panel of cabinet 11.

Figure 3:
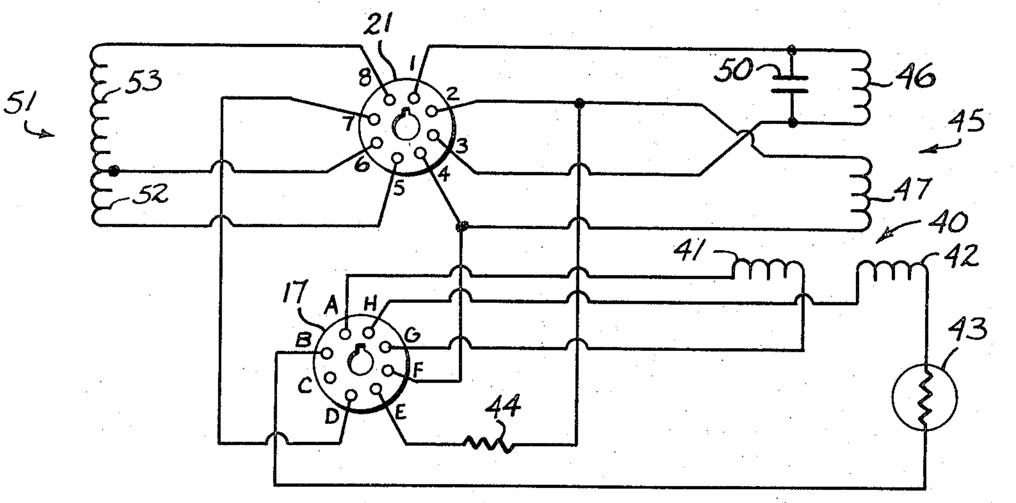
FIG. 3 is a schematic diagram of a portion of FIG. 2.

FIG. 3 illustrates part of FIGS. 1 and 2 in greater detail. Yoke input plug 17 has a plurality of terminals or pins therein labeled A-H. While a standard eight-terminal plug is shown, only seven of the terminals are actually used. The vertical deflection winding 40 of yoke 13 has a first portion 41 connected between pins A and G of plug 17 and a second portion 42 connected between pins B and H of plug 17. A thermistor 43 can be connected in series with vertical winding portion 42, if desired. Vertical winding portions 41 and 42 can be connected in either series or parallel depending upon the particular chassis being tested. For example, some chassis require a low impedance parallel connection while others require a higher impedance series connection. Since the type of connection is a function of the chassis being tested and an adaptor 16 is usually required anyway, the connections between winding portions 41 and 42 can conveniently be provided in adaptor 16. To place winding portions 41 and 42 in series pins G and H are connected together by adaptor 16 with the vertical deflection signal being provided between pins A and B. To place winding portions 41 and 42 in parallel, adaptor 16 connects pins A and H and pins B and G together.

Receptacle 21 has a plurality of terminals or pins labeled 1–8. Terminal 2 is connected to pin E of plug 17 via a resistor 44. Terminal 4 is connected to pin F and terminal 7 is connected to pin D. The horizontal deflection winding 45 of yoke 13 includes a first portion 46 and a second portion 47. A capacitor 50 is connected in parallel with winding portion 46. Winding portion 46 is connected between terminals 1 and 3 of receptacle 21 while winding portion 47 is connected between terminals 2 and 4.

An impedance transformer means illustrated as an autotransformer 51 has a first winding portion 52 and a second winding portion 53. Windings 52 and 53 have a common junction connected to terminal 6 of receptacle 21. The other end of winding 52 is connected to terminal 5 while the other end of winding 53 is connected to terminal 8. Receptacle 21 receives one of a plurality of modules 22 to interconnect horizontal winding 45, autotransformer 51 and, the horizontal deflection signal output of chassis 14 in one of a number of arrangements so that the impedance as "seen" by the horizontal deflection driver circuitry of chassis 14 approximates the impedance of the yoke to which the drive circuitry is normally connected. Several of the numerous arrangments or interconnections are illustrated in FIGS. 4–13.

Figure 4A:
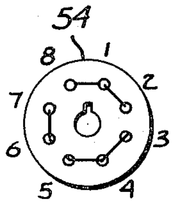
Figure 4B:
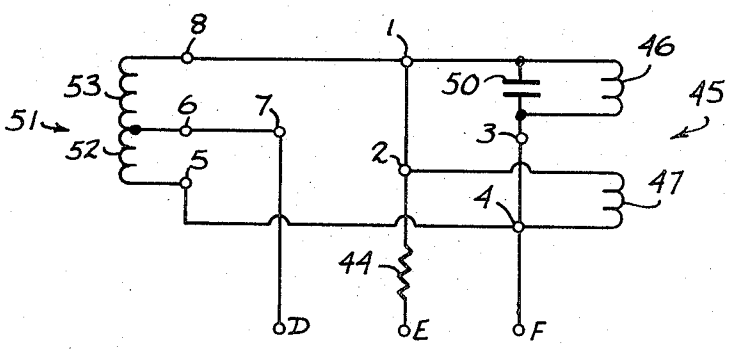

FIG. 4A shows a schematic diagram of a module 54 with terminals or pins 1–8 for mating engagement with terminals 1–8 of receptacle 21. In module 54 pins 1, 2, and 8 are interconnected, pins 3, 4, and 5 are interconnected, and pins 6 and 7 are interconnected. When module 54 is mated or engaged with receptacle 21, the circuit of FIG. 4B results. In the circuit of FIG. 4B winding portions 46 and 47 of horizontal winding 45 are connected in parallel and further in parallel with sutotransformer 51. The horizontal deflection signal is applied between pins D and F of plug 17 and hence across winding 52. Autotransformer 51 acts as a step-up transformer so that the impedance reflected back to the horizontal deflection drive circuitry of chassis 14 is lower than the impedance of windings 46 and 47.

Figure 5A:
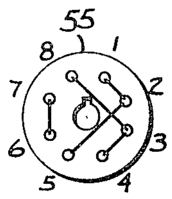
Figure 5B:
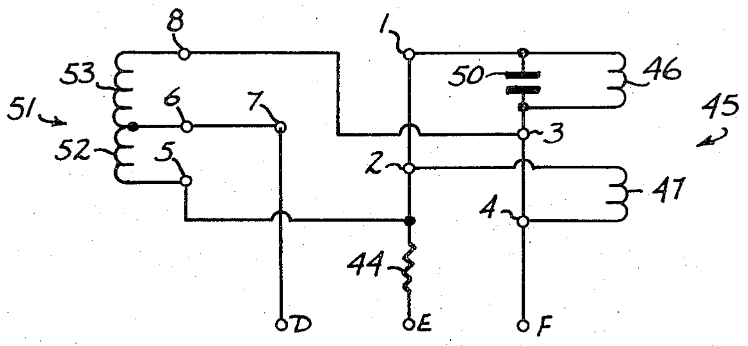

FIG. 5A shows a module 55 similar to module 54 of FIG. 4A with different terminals or pins interconnected. In module 55 pins 1, 2, and 5 are interconnected, pins 3, 4, and 8 are interconnected, and pins 6 and 7 are interconnected so that when module 55 is engaged with receptacle 21, the circuit of FIG. 5B results. The circuits of FIGS. 4B and 5B are similar except that in FIG. 5B the horizontal drive signal is applied across winding 53 instead of winding 52 of autotransformer 51. Autotransformer 51 also acts as a step-up transformer in the circuit of FIG. 5B but with a lower turns ratio. For example, assume that the turns ratio of winding 52 to winding 53 is 1:2. In FIG. 4B autotransformer 51 is connected as a 1:3 step-up transformer while in FIG. 5B it is connected as a 2:3 step-up transformer thereby presenting a higher impedance to the horizontal deflection drive circuitry of chassis 14 than the circuit of FIG. 4B.

Figure 6A:
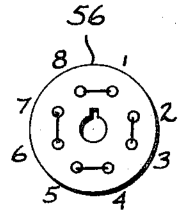
Figure 6B:
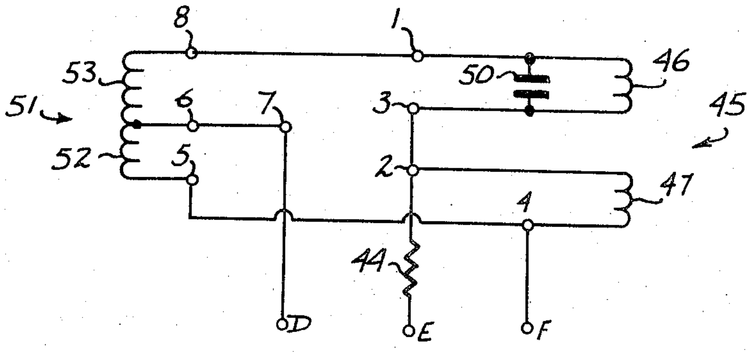

In FIG. 6A module 56 has pins 1 and 8, pins 2 and 3, pins 4 and 5, and pins 6 and 7 interconnected. Use of module 56 results in the circuit of FIG. 6B which is similar to the circuit of FIG. 4B except that horizontal winding portions 46 and 47 are connected in series instead of parallel. Thus, in the example used above autotransformer 51 is a 1:3 step-up transformer which presents the lowest impedance to chassis 14 when windings 46 and 47 are connected in series.

Figure 7A:
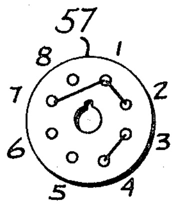
Figure 7B:
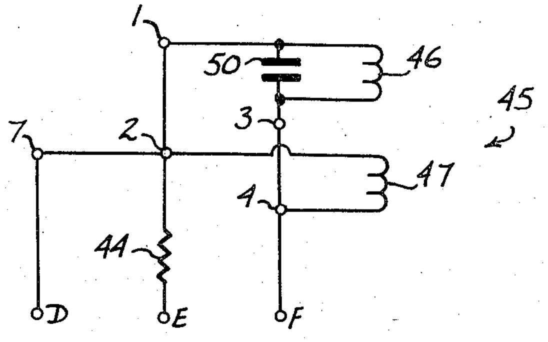

In FIG. 7A module 57 has pins 1, 2 and 7 interconnected and pins 3 and 4 interconnected with pins 5, 6, and 8 unconnected. Thus, the circuit of FIG. 7B results wherein autotransformer 51 is not in the circuit and winding portions 46 and 47 are connected in parallel.

Figure 8A:
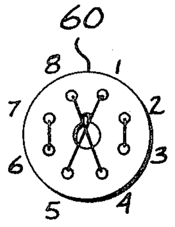
Figure 8B:
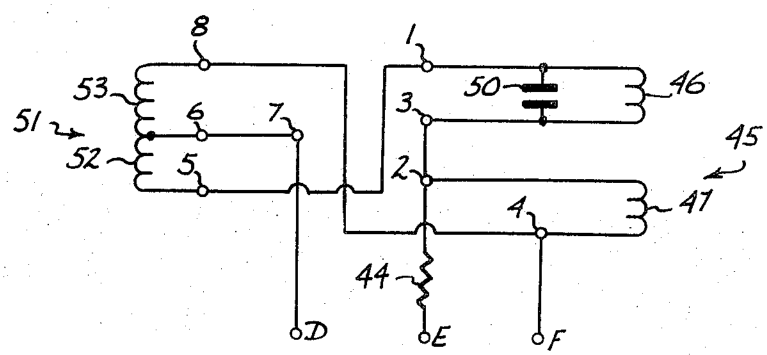

In FIG. 8A module 60 has pins 1 and 5, pins 2 and 3, pins 4 and 8, and pins 6 and 7 interconnected. Use of module 60 provides the circuit of FIG. 8B wherein autotransformer 51 is in a 2:3 step-up mode in the example used above and winding portions 46 and 47 are connected in series.

Figure 9A:
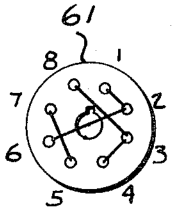
Figure 9B:
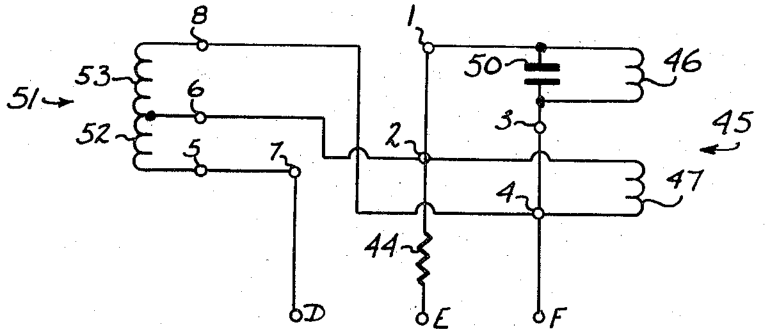

In FIG. 9A module 61 has pins 1, 2, and 6, pins 3, 4, and 8, and pins 5 and 7 interconnected. Module 61 provides the circuit of FIG. 9B wherein autotransformer 51 is connected in a step-down mode and winding portions 46 and 47 are connected in parallel. The horizontal deflection signals applied between pins D and F are coupled across both windings 52 and 53 while parallel connected horizontal winding 45 is connected in parallel with winding 53. In the example used above autotransformer 51 is in a 3:2 step-down mode.

Figure 10A:
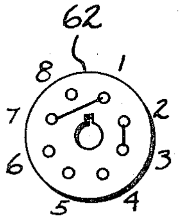
Figure 10B:
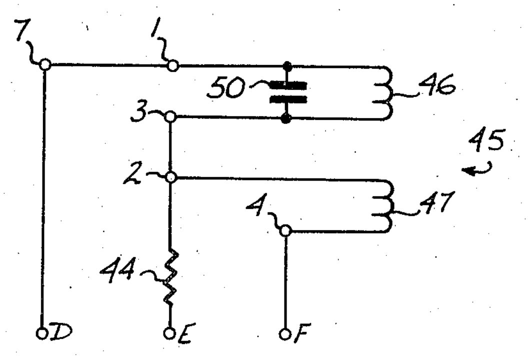

In FIG. 10A module 62 has pins 1 and 7 and pins 2 and 3 interconnected with pins 4, 5, 6, and 8 unconnected. Thus, autotransformer 51 is not connected in the circuit of FIG. 10B while winding portions 46 and 47 are connected in series. In many television receivers that use a yoke configuration similar to the circuit of FIG. 10B neither side of the yoke is grounded, that is, the yoke is floating. In such receivers a resistor such as resistor 44 is used as a return. Thus, when chassis from such receivers are being tested, pin E of plug 17 is connected via lead extension 15 and adaptor 16 to a return point, such as circuit ground, in chassis 14. When testing chassis which do not require resistor 44, pin E is left open or unconnected which can be accomplished in the adaptor 16 used for such chassis.

Figure 11A:
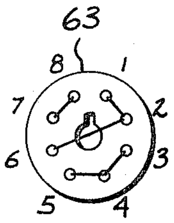
Figure 11B:
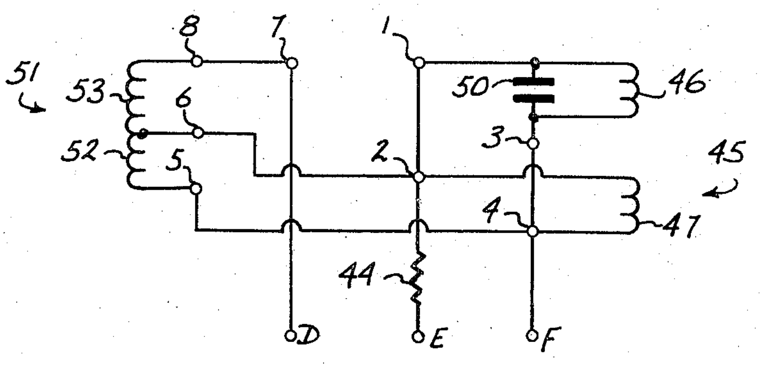

In FIG. 11A module 63 has pins 1, 2, and 6, pins 3, 4, and 5, and pins 7 and 8 interconnected so that the circuit of FIG. 11B results. In FIG. 11B the horizontal deflection signals are applied across windings 52 and 53 while winding portions 46 and 47 are connected in parallel across winding 52. Thus, in the example used above autotransformer 51 is in a 3:1 step-down mode providing the highest impedance to chassis 14 with horizontal winding 45 in a parallel configuration.

Figure 12A:
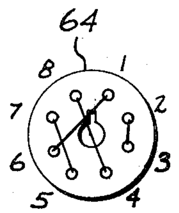
Figure 12B:
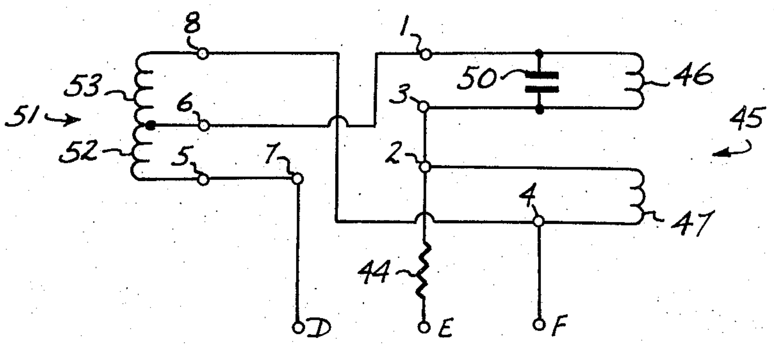

In FIG. 12A module 64 has pins 1 and 6, pins 2 and 3, pins 4 and 8, and pins 5 and 7 interconnected. Thus, the resulting circuit of FIG. 12B is similar to the circuit of FIG. 9B except that winding portions 46 and 47 are in series.

Figure 13A:
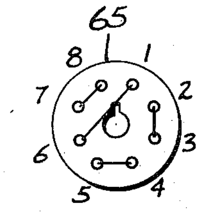
Figure 13B:
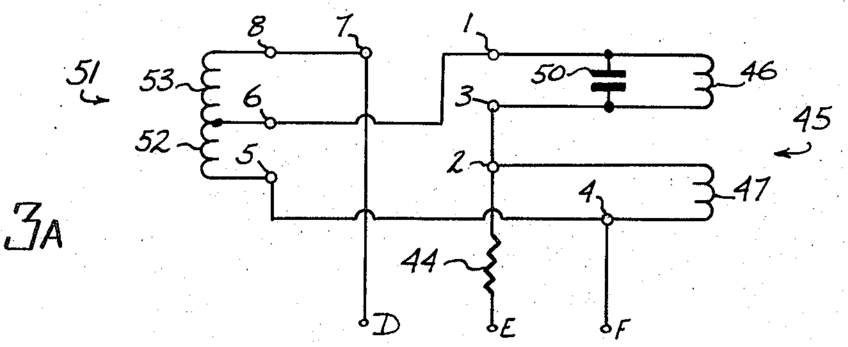

In FIG. 13A module 65 has pins 1 and 6, pins 2 and 3, pins 4 and 5, and pins 7 and 8 interconnected so that the circuit of FIG. 13B results. The circuit of FIG. 13B is similar to the circuit of FIG. 10B except that winding portions 46 and 47 are in series.

While a specific example of a 1:2 turns ratio was used, in actual practice differing turns ratios have been used. Accordingly, those skilled in the art will realize that the turns ratio of autotransformer 51 is a matter of design choice. Also, the impedance transformer means is not limited to autotransformer 51. For example, a transformer with separate primary and secondary windings can be used. An autotransfomrer is preferred, however, because it is less expensive. In one practical embodiment of the invention winding portions 46 and 47 each had an inductance of 6.2 millihenries. In the various circuits the following effective inductances were provided:

| FIG. | Millihenries |
|---|---|
| 4B | 0.5 |
| 5B | 1.2 |
| 6B | 1.65 |
| 7B | 3.1 |
| 8B | 4.0 |
| 9B | 7.3 |
| 10B | 12.5 |
| 11B | 16.5 |
| 12B | 22 |
| 13B | 37 |

Accordingly, there has been shown and described test apparatus for testing the operability of television chassis which is conveniently alterable by substituting modules so that one piece of apparatus can test a wide variety of chassis designed to include any one of numerous deflection systems.

While there has been shown and described what is at present considered the preferred embodiment of the invention, it will be obvious to those skilled in the art that various changes and modifications may be made therein without departing from the scope of the invention as defined by the appended claims.

What is claimed is:

1. In test apparatus for testing the operability of a chassis for providing signals to a cathode ray tube and a deflection yoke mounted in operable relationship with said cathode ray tube, said deflection yoke including horizontal and vertical deflection windings for deflecting an electron beam in said cathode ray tube, said horizontal deflection winding including first and second portions, coupling apparatus for coupling deflection signals from the chassis being tested to said deflection yoke comprising:

a receptacle having a plurality of terminals therein;

means connecting a first set of said plurality of terminals to respective ends of said first and second portions of said horizontal deflection winding;

impedance transformer means having at least three terminals connected to respective ones of a second set of said plurality of terminals;

means for connecting said chassis to a third set of said plurality of terminals comprising at least two terminals for coupling horizontal deflection signals from said chassis to said receptacle; and a plurality of modules each having a plurality of terminals therein for mating with respective ones of said plurality of terminals of said receptacle, said terminals of each of said modules being discretionarily interconnected for connecting said at least two terminals of said third set of said plurality of terminals to corresponding ones of said second set of said plurality of terminals, for connecting said first and second portions of said horizontal deflection winding in series or parallel, and for connecting at least two terminals of said first set of terminals to corresponding ones of said second set of terminals.

2. Coupling apparatus as defined in claim 1 wherein said impedance transformer means is an autotransformer.

3. Coupling apparatus as defined in claim 1 wherein said vertical winding has first and second portions, and said coupling apparatus further includes means for connecting said first and second portions of said vertical winding in series or parallel.

4. Coupling apparatus as defined in claim 1 wherein said impedance transformer means is an autotransformer having three terminals, said horizontal deflection winding is connected between a first pair of said three terminals, and said horizontal deflection signals are applied between a second pair of said three terminals.

5. In test apparatus for testing the operability of a chassis for providing signals to a deflection yoke including vertical and horizontal deflection windings for deflecting an electron beam in a cathode ray tube, coupling apparatus comprising:

a receptacle having a plurality of terminals;

impedance transformer means having a plurality of terminals;

means connecting first, second, and third sets of said plurality of terminals of said receptacle to said horizontal deflection winding, to respective ones of said plurality of terminals of said impedance transformer means, and for receiving horizontal deflection signals from a chassis being tested, respectively, and;

a plurality of modules each having a plurality of mating terminals for mating with respective ones of said plurality of terminals of said receptacle, said mating terminals of each of said modules being interconnected for connecting said horizontal deflection winding to at least two of said terminals of said impedance transformer means and for coupling said horizontal deflection signals to at least two of said terminals of said impedance transformer means whereby engagement of each of said modules with said receptacle provides a different impedance to said chassis being tested.

6. Coupling apparatus as defined in claim 5 wherein said horizontal deflection winding includes first and second portions having ends connected to respective ones of said first set of said plurality of terminals of said receptacle and said terminals of each of said modules are interconnected for connecting said first and second portions in series or parallel.

7. Coupling apparatus as defined in claim 6 wherein said vertical winding has first and second portions, and said coupling apparatus further includes means for connecting said first and second portions of said vertical winding in series or parallel.

8. Coupling apparatus as defined in claim 6 wherein said impedance transformer means is an autotransformer having at least three terminals.

9. Coupling apparatus as defined in claim 8 wherein each of said modules connects said horizontal winding between a first pair of said terminals of said autotransformer and said horizontal deflection signals are applied between a second pair of said terminals of said autotransformer.

* * * * *